US008015073B2

(12) United States Patent
Ilechko et al.

(10) Patent No.: US 8,015,073 B2
(45) Date of Patent: Sep. 6, 2011

(54) INCREASING MARKET EFFICIENCY OF TICKET SUPPLY SYSTEMS

(75) Inventors: Paul Ilechko, Skillman, NJ (US); Alex Sanielevici, Delray Beach, FL (US)

(73) Assignee: International Business Machines Corporation, Armonk, NY (US)

( * ) Notice: Subject to any disclaimer, the term of this patent is extended or adjusted under 35 U.S.C. 154(b) by 1381 days.

(21) Appl. No.: 11/534,921

(22) Filed: Sep. 25, 2006

(65) Prior Publication Data

US 2008/0077505 A1 Mar. 27, 2008

(51) Int. Cl.
G06Q 30/00 (2006.01)
(52) U.S. Cl. ...................................................... 705/26.3
(58) Field of Classification Search .................... 705/26, 705/27, 26.1, 26.2, 26.25, 26.3, 26.35, 26.4, 705/26.41–26.44, 26.5, 26.61–26.64, 26.7, 705/26.8, 26.81, 26.82, 26.9, 27.1, 27.2
See application file for complete search history.

(56) References Cited

U.S. PATENT DOCUMENTS

| | | | | |
|---|---|---|---|---|
| 6,023,685 | A * | 2/2000 | Brett et al. ........................ | 705/37 |
| 6,151,589 | A * | 11/2000 | Aggarwal et al. ............ | 705/36 R |
| 6,704,713 | B1 * | 3/2004 | Brett ................................ | 705/37 |
| 7,003,485 | B1 | 2/2006 | Young | |
| 7,124,062 | B2 * | 10/2006 | Gebhart ........................ | 702/186 |
| 7,231,358 | B2 * | 6/2007 | Singh et al. ................ | 705/14.46 |
| 7,340,428 | B1 * | 3/2008 | White et al. .................... | 705/37 |
| 7,584,123 | B1 * | 9/2009 | Karonis et al. ............... | 705/26.3 |
| 2001/0027434 | A1 | 10/2001 | Alaia et al. | |
| 2002/0082969 | A1 | 6/2002 | O'Keeffe et al. | |
| 2002/0095369 | A1 | 7/2002 | Kaplan et al. | |
| 2002/0128922 | A1 * | 9/2002 | Joao ................................. | 705/26 |
| 2002/0156715 | A1 * | 10/2002 | Wall et al. ........................ | 705/37 |
| 2002/0156749 | A1 | 10/2002 | Sardy | |
| 2003/0004856 | A1 | 1/2003 | Brown et al. | |
| 2003/0018560 | A1 * | 1/2003 | Dietrich ........................ | 705/37 |
| 2004/0083154 | A1 | 4/2004 | Guler et al. | |

(Continued)

OTHER PUBLICATIONS

Richard Cebula et al. "Evidence of Liquidity Constraints Found in the Theme Park Ticket Auctions", Journal of Economics & Finance v29n1 pp. 112-121. Retrieved from Dialog File: 15, Acc#: 02921092.*

No Author, "France: Ticket Auction on Internet for AF.", Les Echos, Jun. 20, 2000, p. 22. Retrieved from Dialog File: 16, Acc#: 07499333.*

*Primary Examiner* — Naeem Haq
(74) *Attorney, Agent, or Firm* — Patents On Demand, P.A.; Brian K. Buchheit; Scott M. Garrett

(57) ABSTRACT

The present invention describes a configurable risk-driven contracting service for limited capacity advanced-scheduled events for which tickets are sold. In the invention, multiple batches of tickets can be released in a time-sequenced fashion. Some of the batches can be auctioned. Dynamic per-batch pricing can be implemented that is based upon a relative market value of the tickets, which can be determined in part by captured auction data. Auction data can include, but is not limited to, bid price, bid volume, bidder diversity, ticket quantities per bid, and bidding frequency. Auction parameters and ticket prices can vary over time in accordance with seller risks and opportunity costs, which can dynamically change as tickets for an event are sold and as the time of the event approaches. Auction bids can be adjusted for bidder selectable constraints, each having a constraint specific value. The invention can utilize one or more Web services.

16 Claims, 4 Drawing Sheets

U.S. PATENT DOCUMENTS

| | | |
|---|---|---|
| 2005/0021447 A1 | 1/2005 | Lawrence |
| 2005/0021450 A1 | 1/2005 | Nakfoor |
| 2005/0091144 A1 | 4/2005 | Longman et al. |
| 2005/0144115 A1 | 6/2005 | Brett |
| 2005/0159962 A1* | 7/2005 | Weiss et al. ............... 705/1 |
| 2007/0244731 A1* | 10/2007 | Barhydt et al. ............. 705/5 |
| 2008/0059256 A1* | 3/2008 | Lynch ......................... 705/7 |
| 2010/0076826 A1* | 3/2010 | Bayne ...................... 705/14.3 |

* cited by examiner

INCREASING MARKET EFFICIENCY OF TICKET SUPPLY SYSTEMS

BACKGROUND

1. Field of the Invention

The present invention relates to the field of event ticket selling, and, more particularly, to a ticket selling solution for limited capacity events that increases market efficiency through dynamic and auction-based pricing and through multiple time sequenced batch releases.

2. Description of the Related Art

Tickets are sold for many limited capacity events, such as airline flights, concert tickets, hotel reservations stays and sporting events. Potential ticket purchasers often have varying demands, constraints, and/or desires. For some purchasers, ticket price is a determinative and overriding factor that determines whether event tickets are to be purchased. Other purchasers are willing to pay a premium for various options and constraints associated with the transaction, such as premium seating, advanced ticket purchase confirmation, the purchase of a block of adjacent seats, the option to cancel a ticket and receive a full or partial refund, the ability to purchase tickets online, delayed ticket payment, and the like.

Conventional ticket supply systems and distribution methodologies are not fully aligned to fulfill market realities. That is, conventional ticket systems fail to properly align ticket supply with market-driven pricing based upon purchaser-imposed constraints, demands and desires, which results in an inefficient market. Third party resellers, sometimes called ticket scalpers, often arbitrage ticket pricing, meaning they buy in-demand tickets at a seller designated price and sell the temporarily purchased tickets at an actual market price, pocketing profits. Even though many states have legally established anti-scalping regulations to prevent or limit profits from ticket reselling, profits realized from this activity have resulted in these regulations being largely ignored. Instead of curbing reselling activities, the regulations have transferred reselling profits to disreputable parties, which increases a risk to ticket purchasers. Consequently, neither potential ticket purchasers nor event coordinators are served by conventional ticket supply methodologies.

What is needed is a ticket distribution methodology with increased market efficiency. Such a method can reward event coordinators with greater profits while increasing ticket availability to consumers through legitimate and safe channels. An efficient methodology should add new market demanded purchasing options for corresponding fees, which would further increase benefits realized by suppliers and by consumers.

Existing systems and/or methodologies fail to satisfy these goals. For example, one conventional ticket supply methodology, common for entertainment events, is to offer fixed pricing by seat category with an all-at-once ticket release. This methodology results in tickets for popular events selling out quickly, which leads to long lines for purchasing tickets, frustrated consumers, and a relatively large spread between a retail ticket price and a ticket market value. Similarly, the fixed price/all-at-once methodology results in excess capacity (tickets not selling) for less popular events, since the retail price per ticket can be greater than the market value. Rewarding early information from bidders incites a maximum of market knowledge by the provider early on, even before tickets are available for sale, resulting in more accurate pricing throughout the sales process.

A different conventional ticket supply methodology, common for airline tickets, is offer variable class-based prices with an all-at-once ticket release, which is referred to as an earliest-seats-cheapest methodology. Tickets having a lower class price sell before tickets with a higher class price. This methodology is based upon a generalized assumption that later buyers are willing to pay more and are more needful of tickets than earlier buyers. In the earliest-seats-cheapest methodology, a ticket supplier loses in several ways as early confirmation (which has consumer value) is given away for free, as well as the opportunity cost incurred by eliminating the possibility of selling the ticket to a more needful buyer in the future for more money.

SUMMARY OF THE INVENTION

The present invention describes a configurable risk-driven contracting service for limited capacity/advanced-scheduled events for which tickets are sold. In the invention, multiple batches of tickets can be released in a time-sequenced fashion. Some of the batches can be auctioned. Dynamic per-batch pricing can be implemented such that it is based upon the market value of the tickets, which can be determined in part by captured auction data. Auction data can include, but is not limited to, bid price, bid volume, constraints imposed by bidders, bidder diversity, ticket quantities per bid, and bidding frequency.

The invention permits configurable premiums to be added or subtracted from bid prices to create a normalized bid, which the invention uses to accept or deny ticket purchase offers. The normalized bid can account for numerous buying and selling factors other than a pure bid price. Some of these factors account for costs to the seller contributed by buyer-imposed constraints on the transaction, such as requiring a Saturday performance, a form of payment that is costly to process, or exit-row seats. These can be referred to as buyer-imposed constraints. Other factors can be referred to as risk premiums, which account for the cost of seller risk as a function of buyer and seller commitment through time.

For example, the risk premium mappings through time can reward early consumer disclosure of information and early consumer commitment, which has value to a seller since each can lower a seller's relative risk. Similarly, the risk premium mappings can penalize a consumer's need for early provider commitment and can penalize a delayed consumer commitment, since both increase risk and opportunity cost to the seller. Therefore, risk premium mappings can be used to adjust bid prices based upon seller and/or consumer opportunity costs and/or opportunity benefits. This allows for fair comparison of normalized bid values after adjustment for positive or negative costs incurred by the seller if the transaction were to be consummated. Values, mappings, and conditions associated with the opportunity costs and/or benefits can be configured by ticket seller, event coordinator, or authorized system administrator.

The present invention can be implemented in accordance with numerous aspects consistent with material presented herein. For example, one aspect of the present invention can include a method for selling tickets for limited capacity events. The method can include a step of designating within a computer system details for a limited capacity event. The details can include an event date and a number of tickets available for the event. Multiple time-sequenced ticket release batches can be established. Each batch can have a batch start time, a batch end time, and a quantity of tickets to be released for that batch. Each ticket can be associated with an available seat for the event. Bids for at least one ticket (or for a set of tickets) in a released batch can be received at any time. The received bids can be ordered in accordance with a determined bid value. Bid value can be converted to a normalized value that accounts for risk, opportunity costs, and the cost of any constraints imposed by the buyer on the sale. At each batch closing, all outstanding eligible bids are considered for acceptance, and can be accepted in the order of most attractive (per the magnitude of the adjusted bid price) to least attractive, where accepting a bid can allocate a number of tickets associated with the bid to a winning buyer. Winning buyers can be notified of the accepted bids.

Another aspect of the present invention can include another method of selling tickets for limited capacity events. The method can include a step of configuring event parameters related to a sale of tickets for a limited capacity event. Multiple time-sequenced ticket release batches can be established for the limited capacity event. Tickets can be auctioned on a per-batch basis, where all bids are received for each batch before any of the bids for tickets of that batch are accepted. Data related to the auctions can be collected and analyzed. Configurable parameters can be dynamically adjusted for subsequent ticket release batches based upon the analyzed data.

Still another aspect of the invention can include a system for selling tickets to limited capacity events that utilizes one or more Web service. The Web service can provide configurable, time sequenced batch releases of tickets to a limited capacity event. Ticket prices and sale parameters can vary between batch releases. Ticket pricing and/or sale parameters for later batch releases can be based at least in part upon collected data obtained from earlier batch releases. At least a portion of released tickets can be auctioned for auction-established prices. The collected data can include auction bidding data.

It should be noted that various aspects of the invention can be implemented as a program for controlling computing equipment to implement the functions described herein, or a program for enabling computing equipment to perform processes corresponding to the steps disclosed herein. This program may be provided by storing the program in a magnetic disk, an optical disk, a semiconductor memory, or any other recording medium. The program can also be provided as a digitally encoded signal conveyed via a carrier wave. The described program can be a single program or can be implemented as multiple subprograms, each of which interact within a single computing device or interact in a distributed fashion across a network space.

It should also be noted that the methods detailed herein can also be methods performed at least in part by a service agent and/or a machine manipulated by a service agent in response to a service request.

BRIEF DESCRIPTION OF THE DRAWINGS

There are shown in the drawings, embodiments which are presently preferred, it being understood, however, that the invention is not limited to the precise arrangements and instrumentalities shown.

DETAILED DESCRIPTION OF THE INVENTION

Figure 1:
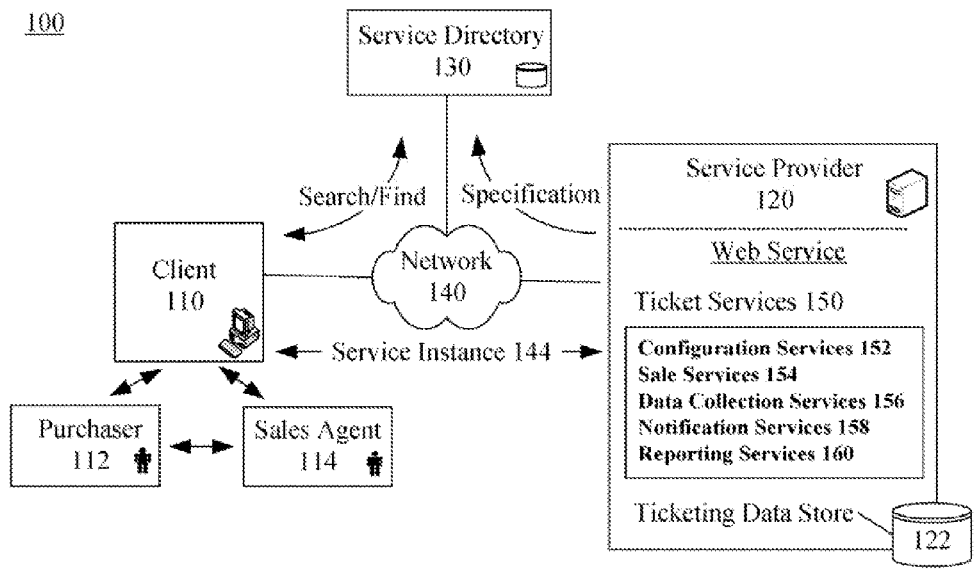
FIG. 1 is a schematic diagram of a system that efficiently handles ticket sales using one or more Web services in accordance with an embodiment of the inventive arrangements disclosed herein.

FIG. 1 is a schematic diagram of a system 100 that efficiently handles ticket sales using one or more Web services in accordance with an embodiment of the inventive arrangements disclosed herein. The Web services can include a variety of ticket services 150 provided by service provider 120. Using the ticket services 150, tickets for a limited capacity event can be in multiple time sequenced batches, where ticket price and batch quantity can be adjusted to maximize profits for an event. Price per ticket can be based on data collected from previously conducted batch sales and/or from ticket sale data gathered for similar events, where the collected data can be stored in ticketing data store 122. Ticket sale prices can be adjusted to account seller risks and opportunity costs, which can vary over time as a time of an event approaches and as tickets for the event are sold. Additionally, system 100 permits customers to impose customer specific constraints when bidding for tickets. When determining winning ticket bids, bid amounts can be adjusted to account for the customer-imposed constraints.

Service provide 120 can be a network-addressable entity that provides one or more Web services. Service provider 120 can be one of many integrated components of a Service Oriented Architecture (SOA). Service provider 120 can interface with one or more back-end systems, such as an event management system, a ticket printing system, an event accounting system, an auctioning system, a communication system, and the like. Service provider 120 can also interface with one or more front-end systems, such as e-commerce Web sites, customer service applications, interactive voice response (IVR) systems, and the like. Service provider 120 can utilize Simple Object Access Protocol (SOAP) based communications to create a service instance 144 associated with one or more of the ticket services 150.

Ticket services 150 can be provided individually or as a set to perform one or more actions of a ticket supply process. The ticket services 150 can include configuration services 152, sale services 154, data collection services 156, notification services 158, reporting services 160, and the like. Configuration services 152 can allow for the setup of an event, ticket sale channels, consumer purchasing options, ticket release scheduling, and the like. Configuration services 152 can also permit risk premium and constraint mappings to be established and/or adjusted. For example, a risk premium mapping/constraint can be established to penalize delayed purchaser 112 commitment, such as increasing a cost of a ticket by five dollars a week, for each week purchaser commitment is delayed. Risk premium mappings, which can normalize ticket amounts to account for opportunity costs and benefits by both buyers and sellers, can vary significant from event-to-event and can be adjusted accordingly.

Sale services 154 can permit consumers to purchase released tickets at auction established prices and/or at fixed prices, where the fixed prices can be based in part upon the auction established prices. Sale services 154 can also provide customer-selectable ticket purchasing options and constraints, where different options and constraints can be associated with option specific fees. Data collection services 156 capture data relating to ticket sales, such as sale frequency for a batch release, price paid per ticket, auction bid time, bid volume, bidder diversity, constraints imposed by bidders, options elected by bidders, and the like. Notification services 158 can notify parties of upcoming events, of event ticket release dates, ticket release quantities, and of ticket purchasing commitments. Reporting services 160 can provide reports of various kinds including, but not limited to, ticket purchase reports, ticket sales reports, and ticket administration reports.

In addition to service provider 120, system 100 can include a client 110 and a service directory 130, each communicatively linked through network 140. The service provider 120 can provide one or more Web services, such as ticket services 150, which is used by an application of client 110. A specification of each Web service (150) can be published to the service directory 130, which can be searched by client 110 in order to discover service 150 details.

Each ticket service 150, like any Web service, can represent reusable software building blocks that are Uniform Resource Locator (URL) accessible. Web service provides a standardized way of integrating Web-based applications executed by the service provider 120 and remotely located client applications over an Internet Protocol (IP) backbone. Web services can rely upon many open standards including eXtensible Markup Language (XML), SOAP, Web Service Description Language (WSDL), and Universal Description, Discovery and Integration (UDDI) standards.

The service directory 130 can be an online directory that provides a uniform way for businesses and organizations to describe available services, service capability, required interface parameters, and output parameters resulting from the described services. The services of the directory 130 can include all services available to client 110, such as services provided by service provider 120. In one embodiment, the service director 130 can use an XML based directory of Web services. Web services specified in the service directory 130 can be described using a WSDL based language. The service directory 130 can be UDDI compliant directory.

Client 110 can be computing device capable of executing applications, which can invoke and utilize one of the ticket services 150. Client 110 can include, but is not limited to, desktop computers, servers, kiosks, IVR systems, mobile telephones, tablet computers, personal data assistants (PDAs), digital media players, and the like. The client 110 can be used by a ticket purchaser 112 directly, such as through a Web-based ticket purchase or a kiosk purchase. Purchaser 112 can also purchase tickets through a sales agent 114, where agent 114 uses client 110 to complete the purchase. Accordingly, the client 110 can be a computing device used in any of a variety of commerce channels.

In one embodiment, the client 110 can include an interface that permits the purchaser 112 or sales agent 114 to impose constraints and tradeoffs upon bids or purchases. The consumer-imposed constraints and tradeoffs can have a quantifiable value to the service provider 120. These quantified values can be used to generate an adjusted or normalized bid.

For instance, using the interface, a purchaser 112 can establish an auction bid of $100 for a Saturday night performance, where Saturday night represents a consumer-imposed constraint having an established value of $20. The constraint can signify that the purchaser 112 would be willing to take a Sunday night ticket for $80 or less ($20 is a premium that the purchaser is willing to pay for a Saturday night ticket). A system of the service provider 120 can compare the customer-imposed constraint against it's own values associated with a Saturday night ticket to determine whether the purchaser 112 wins a Saturday night ticket or a Sunday night ticket (assuming the purchaser 112 wins one or the other). Hence, if the service provider 120 determines a Saturday night ticket has an associated premium value of $30, the purchaser 112 can win the Sunday night ticket for $80. If an associated premium value is determined to be worth $10 to the service provider 120, the purchaser 112 can win the Saturday night ticket for $100.

In addition to consumer-imposed constraints, bids or purchase attempts can be normalized to account for other consumer and/or purchasing characteristics. For example, a bid can be adjusted to account a loyalty rating or a reliability rating computed for a bidding purchaser 112. In another example, a bid or purchase value of a ticket can be adjusted to reflect relative costs associated with a purchasing channel of commerce. For example, if a sales agent 114 receives a commission of ten percent of a ticket sale, this percentage can be subtracted from a normalized purchase value, to represent a value of the ticket sale to a ticket provider.

Network 140 can include any hardware, software, and firmware necessary to convey data encoded within carrier waves. Data can be contained within analog or digital signals and conveyed though data or voice channels. Network 140 can include local components and data pathways necessary for communications to be exchanged among computing device components and between integrated device components and peripheral devices. Network 140 can also include network equipment, such as routers, data lines, hubs, and intermediary servers which together form a data network. Network 140 can also include circuit-based communication components and mobile communication components, such as telephony switches, modems, cellular communications towers, and the like. Additionally, network 140 can include line based and/or wireless communication pathways.

Figure 2:
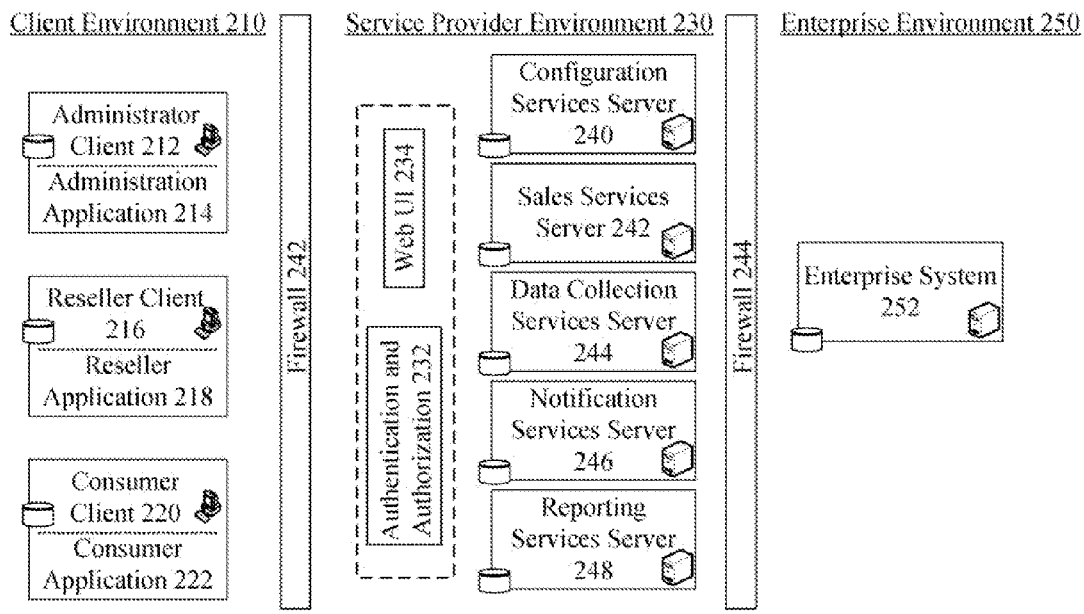
FIG. 2 is a schematic diagram of a ticketing system that utilizes ticket selling Web services in accordance with an embodiment of the inventive arrangements disclosed herein.

FIG. 2 is a schematic diagram of a ticketing system 200 that utilizes ticket selling Web services in accordance with an embodiment of the inventive arrangements disclosed herein. System 200 can represent one embodiment of system 100. System 200 shows a client environment 210, a service provider environment 230, and an enterprise environment 250. Each environment 210, 230, and 250 can be a trusted environment that utilizes a firewall 242 and 244 to restrict potentially harmful outside communications.

The enterprise environment 250 can include back-end enterprise systems 252 that utilize one or more service of environment 230. For example, enterprise system 252 can include an airline flight scheduling system, where tickets for scheduled flights are sold using the services of environment 230. In another example, enterprise system 252 can include an entertainment coordination system that coordinates a tour for a concert performer, where tickets for various tour locations can be sold using services of environment 230.

In one embodiment, the enterprise system 252 can include a legacy ticket selling system, such as a system used by TICKETMASTER. A portion, such as twenty percent, of an event's tickets can be sold using services of environment 230 while a different portion, such as eighty percent, of the tickets can be sold using the legacy ticket selling system. Further, the services of environment 230 can (for a price) add user-selectable options for ticket purchases, not provided by a legacy ticket selling system of environment 250. For example, environment 230 can provide an optional service that permits a customer to hold a set of tickets for a designed hold period for an established price, where the option is associated with an option fee. After the hold period, the tickets must either be purchased for the established price or be released back into an available pool of tickets, the option fee is due either way.

In a particular embodiment, the legacy system (or any enterprise system 252) can use services of environment 230, where services of environment 230 can purchase event tickets from the legacy ticket selling system of environment 250, potentially sharing surplus revenue, if any, generated by sales exceeding an established retail cost. In one embodiment, a legacy ticket selling system can reserve a set of tickets for sale through services of environment 230, where final sale of the reserved tickets is contingent upon meeting or exceeding a retail ticket price, which is not due until consumers from environment 210 confirm ticket purchases obtained using services of environment 230.

In another embodiment, a limited set of available services from environment 230 can be used by enterprise system 252. For example, the enterprise system 252 can use data from data collection services server 244 to establish a retail price for tickets sold through conventional retail channels. An enterprise system 252 can also use notification and/or reporting services of servers 246 and/or 248, without using the configuration services or sales services of servers 240 and/or 242.

The client environment 210 can include any number of clients, such as an administration client 212, a reseller client 216, and a consumer client 220. The administrator client 212 can include an administrator application 214, which can be used to access configuration services server 240. The administrator application 214 can also use a Web service of environment 230 to view, monitor, and/or modify an aspect of enterprise system 252.

The application reseller client 216 can include an application reseller application 218, which can transparently use one or more of the services of environment 230. For example, the reseller application 218 can be an application used by ticket sales agents and/or ticket selling front-end systems. The reseller application 218 can also include a front-end ticket auctioning Web site, such as EBAY, that automatically auctions event tickets using one or more Web services of environment 230.

The consumer client 220 can be a computing device directly used by a purchaser, which includes purchaser application 222. The consumer client can, for example, be a ticket purchasing kiosk or a client-owned desktop computer that purchases tickets from an e-commerce Web site. Each of the applications 214, 218, and 222 can be a Web-based application having one or more functions provided by a Web service of environment 230. For example, each of the applications 214, 218, and/or 222 can utilize a Web based user interface 234. Different user interfaces 234 can be associated with different Web sites, each providing a customized variant of applications 214, 218, and 222. The applications 214, 218, and 222 can be accessed using a Web browsing program local to client 212, 216, and/or 220.

In one embodiment, one or more authentication and authorization processes of engine 232 will be required before client 212, 216, and/or 220 can access services of environment 230. Any of a variety of authentication and/or authorization technologies can be used. Authentication and/or authorization can be based, for example, upon user id and password, client certificates, biometric input, smart card data, a challenge-response mechanism, and the like. In one embodiment, different accessed sections of environment 230 can require section specific authorization information. For example, a payment service provided by sales service server 242 can require an accessing client 212, 216, and/or 220 provide credit card information and consumer confirmation information. One or more authentication and authorization processes of engine 232 can be optionally implemented as Web services.

In another contemplated embodiment, a single sign-on (SSO) technology can be used to enable users to authenticate once and gain access to all accessible resources of multiple computing systems of environment 230. Further, SSO integration between environment 230 and third party partners, such as an auction Web site or an event information Web site, is contemplated. For example, a federated SSO technology that uses standards-based protocols, such as Security Assertion Markup Language (SAML) based standards or WS-Federation based standards, can be used to avoid a need for redundant authentication between environment 230 and external resources provided by third party partners.

Environment 230 can include one or more servers 240-248, which provide Web services for ticketed events. As shown, environment 230 includes a configuration service server 240, a sales service server 242, a data collection services server 244, a notification services server 246, and a reporting services server 248.

The servers 240-248 are compartmentalized by function, which is not a limitation of the invention. The functionality expressed for each of the servers 240-248 can be segmented and distributed across multiple different Web services and/or servers. Additionally, the functionality of servers 240-248 can be consolidated into a single server and functions of multiple Web services can be consolidated into a Web service implemented at a higher granularity level. Web services and parameters of the same are presented for illustrative purposes only, and derivatives and alterations are contemplated.

Configuration services server 240 provides Web services for configuring a limited capacity event for initial ticket sales. Configuration setting can include event calendaring parameters, event location, available seating, seating classifications, minimum revenue thresholds, consumer options, channels of commerce for ticket sales, batch release data, risk to profit mappings, and the like. More specifically, configuration services can include resource description service(s), batch release services(s), and/or risk-premium mapping service(s).

The resource description services can include performance times, performance locations, event performers, and other event specific information. For each performance, location specific parameters, such as seating arrangements, seating categories, and the like can be specified using the resource description services. The resource description services can provide seating chart information, location mapping information, parking information, and other event/location specific information, which may be useful to a ticket purchaser.

As previously noted, tickets for an event can be sold in a sequence of time-released batches. Parameters for numbers of tickets to release per batch, a ticket release time, a batch release ending time, and the like can be specified using the batch configuration services. Additionally, different sales options can be specified per batch, such as options for auction sales and/or fixed price sales. Prices for the fixed price sales can dynamically change per batch. Different classes of tickets can be handled separately within each batch. Further, different marketing channels can be price differentiated, so that price for auctioned tickets and/or available purchase options (auctioning channel) can be different than a price and/or purchasing options for tickets sold using by customer service agent (agent assisted channel), which can also be different from a price and/or purchasing options for tickets sold via a Web site (e-retail channel).

Other parameters can permit batch size and release frequency to increase as an event date approaches. Tradeoff parameters can be established, such as establishing a slower ticket release for higher seat prices and/or a faster release for a higher sellout probability. A number of tickets per batch and/or batch end times can be dynamically adjusted mid-release to respond to unpredicted market response. For example, if prices received for tickets of a particular batch (assuming auction pricing) are higher than expected, a quantity of tickets in that batch can be automatically increased to take advantage of the desired retail price.

The risk premium mapping services can add configurable risk/benefit parameters to batch handling algorithms and value determination calculations. For example, the risk premium mapping services can be used to configure a function for expressing opportunity cost of early provider confirmation through time, a function expressing opportunity benefit of early consumer confirmation, a function expressing the opportunity benefit of early consumer disclosure of information, and other functions. Additional risk premium or preferences can be assigned based upon any available customer characteristic, such as customer location, customer loyalty, payment reliability, and the like.

Characteristics, such as customer loyalty and/or payment reliability, can be used to determine a relative value of a customer's bid. That is, system 200 might reward customer loyalty or high payment reliability with an increased "bid value" relative to other bidders not having high loyalty or a high payment reliability. In one embodiment, special ticket releases can be held exclusively for loyal customers and/or customers who are members of an incentive program. Risk premium rules can differ per event resource, class of service, and the like.

The sales services server 242 can provide Web services for conducting sales. For example, an auction Web service can be provided by server 242 that auctions a designated quantity of tickets, for an established time, according to configurable auction parameters. Third party auction Web sites, such as EBAY, not directly affiliated with system 200 can be integrated with the auction Web service. For instance, once parameters are established via the auction Web service, the service can automatically submit appropriate auction entries along with requisite auction fees to the third party auction Web site. The action Web service is not limited to Web based auctions, and can include mailed auctions, service center assisted auctions, physical auctions, and the like.

In another example, a fixed-fee Web service provided by server 242 can sell tickets at a fixed price. This price can by dynamically adjusted, as market-prices shift. The price can also vary from ticket release to ticket release. Further, a purchasing option service can be provided by sales service server 242. Purchasing options can be handled separately from actual ticket sales, so that "option" purchases can be made independent of the associated sales. Options can include such things as cancellation options, deferred commitment options, deferred payment options, upgrade options, options guaranteeing a seat notwithstanding an event being oversold (common with airline tickets), and the like. For auction-based ticket sales, options and bid option fees can be grouped with a bid for tickets. A relative value of a bid can depend on desired options, bid option fees, and a relative cost of an option to a ticket-seller.

Data collection services server 244 can automatically collect and analyze ticket sale and consumer data. Server 244 can include a consumer information service that collects name, payment information, location information, membership and/or loyalty program status, and the like from customers. Server 244 can also include sale specific information including, but not limited to, bid amount, quantities of tickets desired, bid options, option fees, bid time relative to a batch release, bid frequency for an event, bid history for similar event, and the like. Consumers who provide early and comprehensive data can be rewarded by risk premium mappings, since this data can be valuable to a seller as it will reduce the seller's market risk. For example, a normalized value of a bid for a customer who has provided early and complete information can be five dollars greater than a bid associated with a customer who has not provided complete or early information to system 200. Data mining techniques can be used to determine trends and/or patterns in collected data, which can be used to adjust ticket sale parameters for a current and/or subsequent ticket batch release.

Notification services server 246 can provide one or more notification services that informs a bidder, ticket purchaser, and/or potential ticket purchaser of an upcoming event, a ticket release for the event, event availability, bid status, and the like. Notification services can also inform parties of existing purchasing commitments (which have or have not been paid for) and/or available options for releasing a party from a previous commitment, potentially for a fee. Notification services can also notify parties of options available for altering purchased tickets, such as to alter an airline flight from an existing time to a different time. Altering details for purchased tickets can include a reward, such as a cash incentive, free upgraded service/seating, a voucher applicable for future ticket purchases, and the like.

In one embodiment, the notification service in combination with a sale service can optionally convey an offer to winning and/or losing bidders, which can be customized for a specific bidder. For example, a winning bidder can be provided an option to purchase one or more additional tickets for an event. A losing bidder can be provided an option to purchase tickets for a different performance time or location at the bidder-submitted price, an option to purchase a different class of tickets for different prices, and/or an option to purchase a ticket at a price above a bidding price. Further, when ticket sales are slower than expected, non-winning bidders of early batch releases can be provided an option to purchase tickets in accordance with previously denied bids. Options and offers provided through the notification services server 246 can time expire. The notification server can utilize any channel of communication, such as e-mail, telephone, fax, instant messaging, and the like, to communicate with desired parties.

Reporting services server 248 can provide one or more reporting services, which can be tailored to event coordinators, ticket resellers, customer, event performers, accountants, and the like. Reporting services 248 can be customized to directly integrate with different computing systems and/or Web sites. A customer can use a reporting Web service to automatically update sales/ticket information in a personal accounting program/calendaring program. A ticket seller can use reporting Web services to forecast revenue for an event, to manage ticket availability for an event, to determine future batch size of ticket release batches, and the like.

In system 200, various data stores can be associated with system components 212, 216, 220, 240, 242, 244, 246, 248, and/or 252, as shown. Each data store can be a physical or virtual storage space configured to store digital information. The data stores can be physically implemented within any type of hardware including, but not limited to, a magnetic disk, an optical disk, a semiconductor memory, a digitally encoded plastic memory, a holographic memory, or any other recording medium. Each of the data stores can be a stand-alone storage unit as well as a storage unit formed from a plurality of physical devices. Additionally, information can be stored within any of the data store in a variety of manners. For example, information can be stored within a database structure or can be stored within one or more files of a file storage system, where each file may or may not be indexed for information searching purposes. Further, the data stores can utilize one or more encryption mechanisms to protect stored information from unauthorized access.

Figure 3:
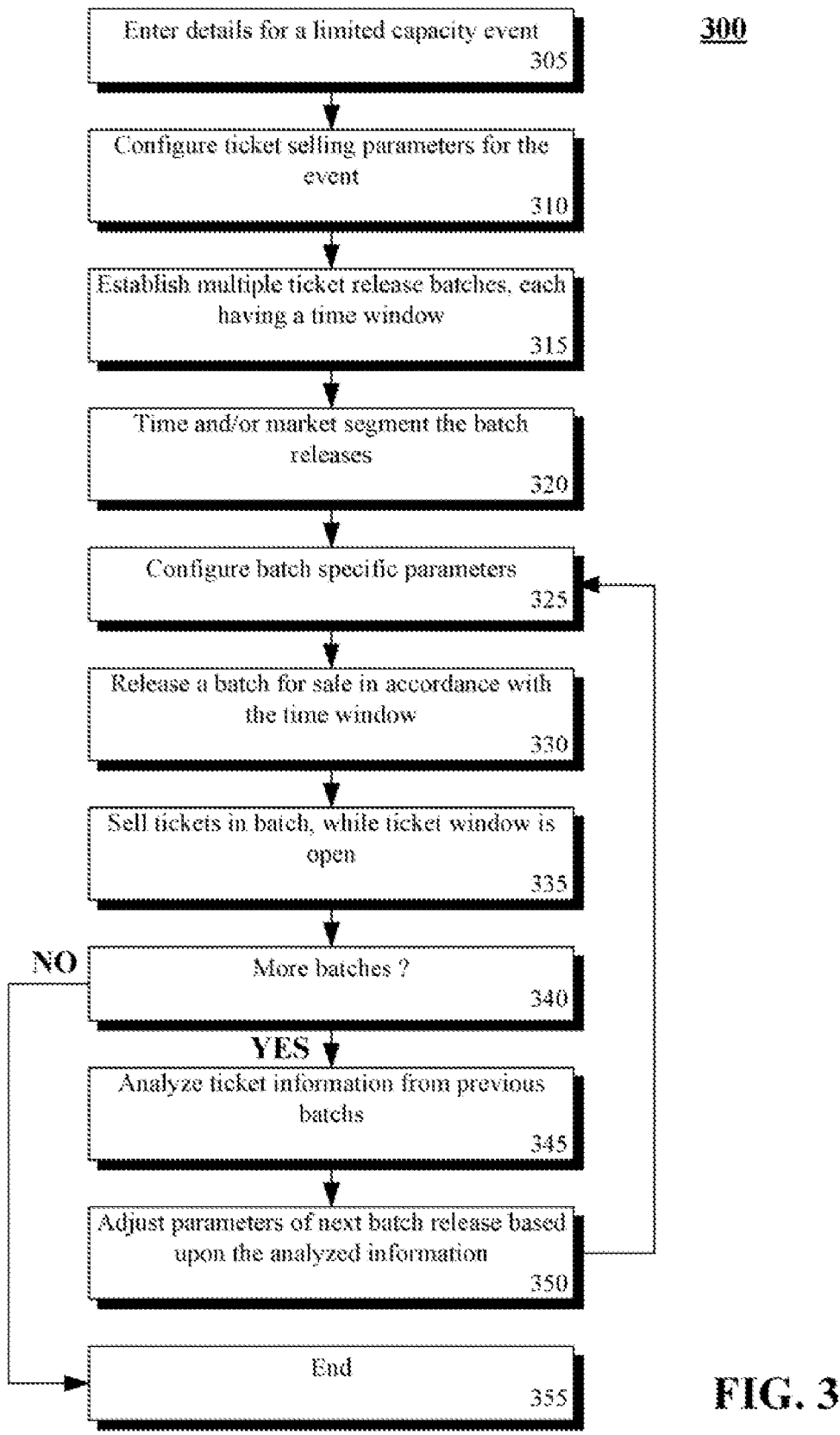
FIG. 3 is a flow chart of a method for selling tickets in accordance with an embodiment of the inventive arrangements disclosed herein.

FIG. 3 is a flow chart of a method 300 for selling tickets in accordance with an embodiment of the inventive arrangements disclosed herein. Method 300 can be performed in the context of a system 100, 200, or similar system.

Method 300 can begin in step 305 where details for a limited capacity event can be entered. In step 310, ticket selling parameters for the event can be configured. These parameters include risk premium mappings, which normalize ticket prices to account for opportunity costs and benefits experienced by the ticket seller and ticket purchasers. In step 315, multiple ticket release batches can be established, each with its own time window. In step 320, each of the batches can be separated and distinguished from other batches by time of release, class of ticket, market segment to whom the releases is available, channel of commerce of the release, and by other criteria.

In 325, batch specific parameters can be configured. In step 330, a batch can be released for sale in accordance with a time window. The batch sales can be auction-based and/or fixed-price based depending on the batch and associated parameters. In step 335, tickets in the batch can be sold while the time window is open. When tickets are sold by auction, winning bids can be determined at the end of the time window. Winning bids can be determined by first normalizing the submitted bids in accordance with the configured risk premium mappings. In step 340, a determination can be made as to whether additional ticket release batches exist; and, if not, the method can end in step 355.

Otherwise, the method can progress from step 340 to step 345, where ticket sale information can be analyzed. For fixed-price sales, time of sale, frequency of sale, tickets remaining, ticket price, and the like can be used to determine/refine a market value of the tickets. For auction sales, auction bids can be used in the same fashion. In step 350, parameters for the next batch release can be adjusted based upon the analyzed information. Notifications can also be optionally sent to parties before the next batch release. The method can loop to step 325, where batch parameters for the next batch can be configured, followed by a release of tickets for that batch.

Figure 4:
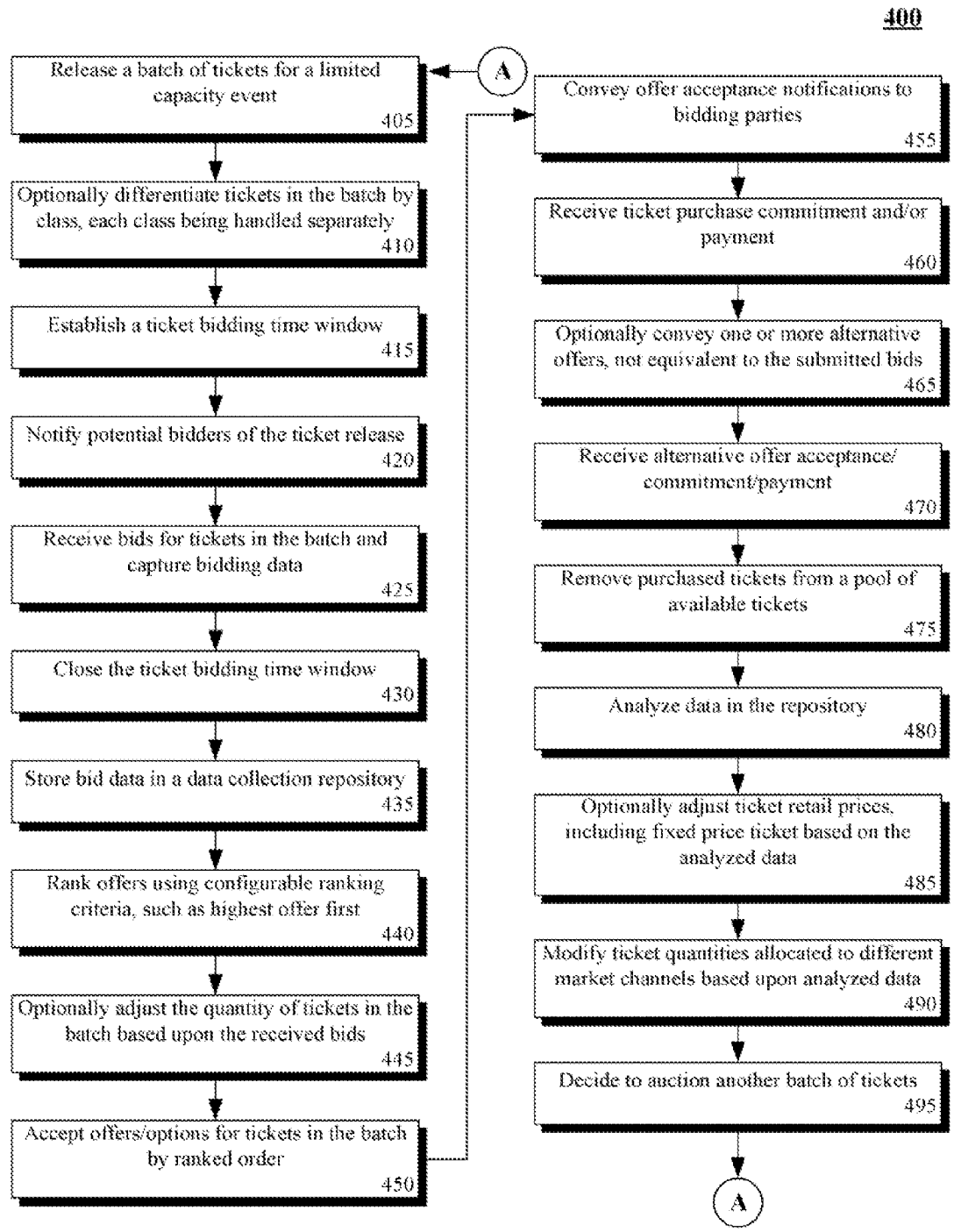
FIG. 4 is a flow chart of a method for auctioning tickets in accordance with an embodiment of the inventive arrangements disclosed herein.

FIG. 4 is a flow chart of a method 400 for auctioning tickets in accordance with an embodiment of the inventive arrangements disclosed herein. Method 400 can be performed in the context of system 100, a system 200, or any other system permitting batch-released tickets sales for a limited capacity event. Method 400 can represent functionality of one contemplated Web service for auctioning tickets. It should be understood that other auctioning methodologies can be used with the present invention.

Method 400 can begin in step 405, where a batch of a designated sized (size X) of tickets can be released for an event. In step 410, tickets within the batch can be optionally differentiated by class, where each class of tickets is separately auctioned. For example, tickets can be segmented by seating zones, such as first class, business class, and coach for an airline flight event and orchestra, mezzanine, box seats, and balcony for an entertainment event. Presumably, the different seating zones have a different retail and/or market value. In step 415, a ticket bidding time window can be established for the batch. At an end of a bidding cycle, bidders can be informed whether their bids for tickets in the batch have been accepted and asked to pay for and/or confirm their ticket bids.

In step 420, potential bidders can be notified of the ticket release. Notification can be made through direct marketing channels, such as by emailing a set of recipients who have previously expressed an interest in the event and who have asked to be notified of bidding cycles. Notification can also occur through any advertising channel. In step 425, bids can be received. Bids can potentially have user-imposed restrictions and/or options, upon which bids are contingent. For example, a bid can be contingent upon receiving twenty consecutive seats. Additionally, bids can be for a generic ticket, but can also include additional bids for ticket options. A ticket seller can accept the bid for the generic ticket without the options or can elect to accept the bid with one or more of the user provided options at the seller's discretion. In step 430, a bidding time window can expire.

In step 435, bidding data can be stored in a data collection repository. In step 440, offers can be ranked using configurable ranking criteria, such as highest offer first. A bid value used for ranking can be based upon factors other than price, such as customer loyalty, customer reliability rating, advance notice given, constraints imposed by the customer, and options elected by the customer. In other words, bids can be adjusted in accordance with previously configured risk premium mappings so that buyers are rewarded for factors beneficial to a ticket seller and penalized for factors costly to the ticket seller. In step 445, quantities of tickets in a batch can be optionally adjusted based upon received bids. For example, when bids are relatively high, a number of tickets can be added to the estimated release quantity to take advantage of the high bids. Similarly, when bids are low, a number of tickets can be removed from the estimated release quantity. In one embodiment, adjustments can be limited to a fixed percentage of originally released tickets, such as plus or minus fifteen percent, to encourage sales across multiple channels of commerce. This percentage can be one of many configurable parameters of the method.

In step 450, bids for tickets and/or for ticket options can be accepted by rank order. It should be appreciated that some options, such as for-fee option to reserve a ticket or set of tickets for a designated time interval for a cost, can be independent of a ticket sale. In step 455, offer acceptance or non-acceptance notifications can be conveyed to bidding parties. In step 460, a ticket purchase commitment and/or payment can be received. In step 465, one or more alternative offers, which are not identical to currently valid bids, can be conveyed to bidders. For example, a bid (offer) that has time expired can be accepted (thereby becoming a new offer) by a seller subject to buyer approval (acceptance). In step 470, responses to offers can be received and/or can expire. Payment for accepted ones of the offers can be received.

In step 475, purchased (or confirmed) tickets can be removed from a pool of available tickets. Remaining tickets allocated to the batch, if any, can be reallocated to the pool of available tickets. In step 480, collected data placed in the repository can be analyzed to determine/refine a "a market value" for an event tickets. In step 485, fixed fee ticket prices can optionally be dynamically adjusted based upon the calculated market value of remaining tickets. In step 490, ticket quantities allocated to different market channels can also be modified based upon the analyzed data. For example, if an auction channel was particularly profitable according to the analysis, additional tickets can be allocated to that resale channel from other channels. In step 495, a decision to auction another batch of tickets can be made causing the method to loop to step 405, where the tickets included in the new batch are released.

Figure 5:
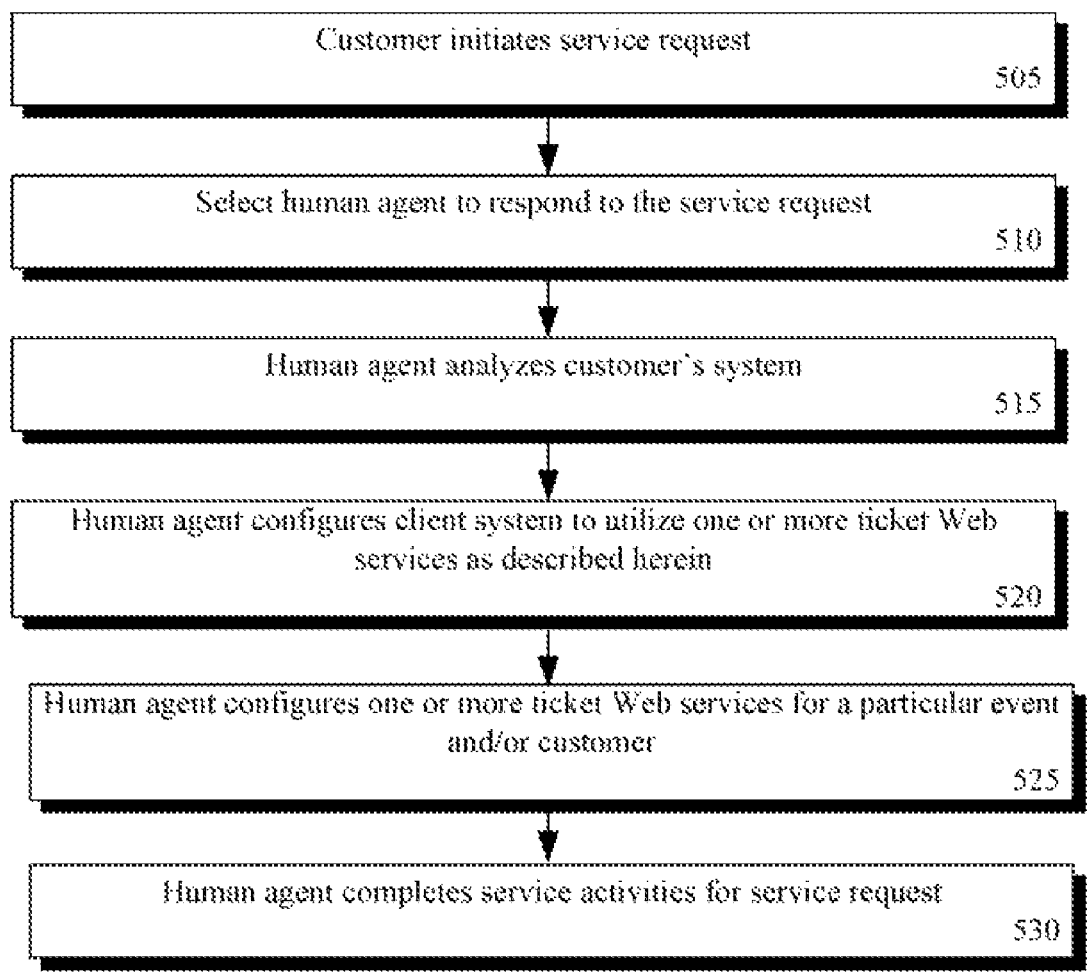
FIG. 5 is a flow chart of a method, where a service agent can configure a system that uses Web services to sell tickets in accordance with an embodiment of the inventive arrangement disclosed herein.

FIG. 5 is a flow chart of a method 500, where a service agent can configure a system that uses Web services to sell tickets in accordance with an embodiment of the inventive arrangements disclosed herein. Method 500 can be preformed in the context of system 100, 200, and/or a method 400.

Method 500 can begin in step 505, when a customer initiates a service request. The service request can be a request for a service agent to configure a ticket selling event for an event coordinator. The request can also be a request to establish a new computing system and/or Web page that utilizes a ticket selling Web service as described herein. Additionally, the request can also be a request to repair a problem with an existing computing system that uses a ticket selling Web service. Further, the service request may be a request for training relating to a ticket selling system, such as system 100.

In step 510, a human agent can be selected to respond to the service request. In step 515, the human agent can analyze a customer's current system and can develop a solution. In step 520, the human agent can configure the customer's system to enable tickets to be sold using the ticket selling Web services described herein. In step 525, the human agent can configure one or more ticket selling Web services for a particular event and/or customer. In step 530, the human agent can complete the service activities.

It should be noted that while the human agent may physically travel to a location to adjust the customer's computer or application server, physical travel may be unnecessary. For example, the human agent can use a remote software agent to remotely manipulate the customer's computer system.

The present invention may be realized in hardware, software, or a combination of hardware and software. The present invention may be realized in a centralized fashion in one computer system or in a distributed fashion where different elements are spread across several interconnected computer systems. Any kind of computer system or other apparatus adapted for carrying out the methods described herein is suited. A typical combination of hardware and software may be a general purpose computer system with a computer program that, when being loaded and executed, controls the computer system such that it carries out the methods described herein.

The present invention also may be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

This invention may be embodied in other forms without departing from the spirit or essential attributes thereof. Accordingly, reference should be made to the following claims, rather than to the foregoing specification, as indicating the scope of the invention.

What is claimed is:

1. A method for selling tickets comprising:
designating within a computer system event details that include an event date and a number of tickets available for the event;
determining, via at least one program executing on computing equipment, wherein the at least one program is stored on a non-transitory storage medium, a plurality of time sequenced ticket release batches, each batch having a batch start time, a batch end time, and a quantity of tickets to be released for that batch, wherein each ticket is associated with an available seat for the event;
receiving, via at least one program executing on computing equipment, wherein the at least one program is stored on a non-transitory storage medium, auction based bids for the tickets;
at the end of each batch, ordering, via at least one program executing on computing equipment, wherein the at least one program is stored on a non-transitory storage medium, received bids in accordance with a determined bid value; and
accepting, via at least one program executing on comment wherein the at least one program is stored on a non-transitory storage medium, bids in order according to said ordering step, where accepting a bid allocates a number of tickets associated with the bid to a winning bidder; and
notifying, via at least one program executing on computing equipment, wherein the at least one program is stored on a non-transitory storage medium, winning bidders of the accepted bids, wherein a plurality of the release batches are auctioned, wherein the quantity of tickets per release batch is increased as a time to the event approaches, and wherein a frequency of release batches increases as a time to the event approaches.

2. The method of claim 1, wherein at least a portion of the received bids have an associated bid duration that spans a plurality of the ticket release batches.

3. The method of claim 1, wherein each step of method 1 is performed by at least one computing system in accordance with a set of programmatic instructions, wherein at least a portion of the programmatic instructions are associated with at least one remotely executing software component, wherein said software component is Uniform Resource Locator (URL) accessible and is configured to exchange data with said computing system using standardized Extensible Markup Language (XML) based messaging protocols, whereby the at least one remotely executing software component is implemented as a Web Service or similar software component.

4. The method of claim 1, said accepting step further comprising:
adjusting, via at least one program executing on computing equipment, wherein the at least one program is stored on a non-transitory storage medium, each bid value based upon opportunity costs and opportunity benefits experienced by at least one of a ticket seller and a ticket consumer, wherein the ordering and receiving step utilize the adjusted bid value.

5. The method of claim 4, further comprising:
for each bid, receiving, via at least one program executing on computing equipment, wherein the at least one program is stored on a non-transitory storage medium, at least one user specified bid constraint;
assigning, via at least one program executing on comment wherein the at least one program is stored on a non-transitory storage medium, a value for each of the bid constraints; and
adjusting, via at least one program executing on computing equipment, wherein the at least one program is stored on a non-transitory storage medium, the determined bid value of each bid according to the assigned values associated with the bid constraints.

6. The method of claim 1, further comprising:
collecting, via at least one program executing on computing equipment, wherein the at least one program is stored on a non-transitory storage medium, data related to the received bids;

analyzing, via at least one program executing on computing equipment, wherein the at least one program is stored on a non-transitory storage medium, the collected data; and dynamically adjusting, via at least one program executing on computing equipment, wherein the at least one program is stored on a non-transitory storage medium, parameters of a subsequent one of the ticket release batches based at least in part upon the analyzed data.

7. The method of claim 1, wherein the steps of claim 1 are performed by at least one of a service agent and a computing device manipulated by the service agent, the steps being performed in response to a service request.

8. A method of selling tickets comprising:

configuring, via at least one program executing on computing equipment, wherein the at least one program is stored on a non-transitory storage medium, event parameters related to a sale of tickets for a limited capacity event;

collecting, via at least one program executing on computing equipment, wherein the at least one program is stored on a non-transitory storage medium, data related to auctioned tickets, wherein the collected data comprises at least two data elements selected from a group of elements comprising bid price, bid volume, bidder diversity, ticket quantities per bid, bidding frequency, constraints imposed by bidders, and options elected by bidders;

analyzing, via at least one program executing on computing equipment, wherein the at least one program is stored on a non-transitory storage medium, the collected data;

dynamically adjusting, via at least one program executing on computing equipment, wherein the at least one program is stored on a non-transitory storage medium, said event configurable parameters for the limited capacity event based upon the analyzed data;

auctioning, via at least one program executing on computing equipment, wherein the at least one program is stored on a non-transitory storage medium, tickets for the limited capacity event, wherein specifics of the auctioning step vary based upon determinable seller risks and upon the start and end times associated with an auction;

receiving, via at least one program executing on computing equipment, wherein the at least one program is stored on a non-transitory storage medium, a plurality of bids, said bids including bidder specific factors;

determining, via at least one program executing on comment wherein the at least one program is stored on a non-transitory storage medium, factor values for each of the specific factors;

adjusting, via at least one program executing on computing equipment, wherein the at least one program is stored on a non-transitory storage medium, a value for each bid in accordance with the determined factor values; and accepting, via at least one program executing on comment wherein the at least one program is stored on a non-transitory storage medium, bids based upon the adjusted values.

9. The method of claim 8, wherein the specific factors include at least two factors selected from a group of factors consisting of a customer loyalty rating, a customer reliability rating, options elected by a customer, and customer selected constraints imposed upon an associated bid.

10. The method of claim 8, wherein the specific factors include at least one factor selected from a group of factors consisting of a customer commitment time, a seller commitment time, and a quality of consumer data provided by the customer to the seller.

11. The method of claim 8, wherein each step of method 9 is performed by at least one computing system in accordance with a set of programmatic instructions, wherein at least a portion of the programmatic instructions are associated with at least one remotely executing software component, wherein said software component is Uniform Resource Locator (URL) accessible and is configured to exchange data with said computing system using standardized Extensible Markup Language (XML) based messaging protocols, whereby the at least one remotely executing software component is implemented as a Web Service or similar software component.

12. The method of claim 11, wherein the specific factors comprise at least three factors selected from a group of factors consisting of a bid price, payment reliability, customer loyalty, at least one customer selected purchasing option associated with the bid, at least one customer imposed purchasing constraint associated with the bid, a consumer commitment time, and a seller commitment time.

13. A computer program product comprising a computer readable storage medium having computer usable program code embodied therewith, the computer usable program code comprising:

computer usable program code stored on a non-transient storage medium that upon being executed by a processor is operable to configure event parameters related to a sale of tickets for a limited capacity event;

computer usable program code stored on a non-transient storage medium that upon being executed by a processor is operable to collect data related to auctioned tickets, wherein the collected data comprises at least two data elements selected from a group of elements comprising bid price, bid volume, bidder diversity, ticket quantities per bid, bidding frequency, constraints imposed by bidders, and options elected by bidders;

computer usable program code stored on a non-transient storage medium that upon being executed by a processor is operable to analyze the collected data;

computer usable program code stored on a non-transient storage medium that upon being executed by a processor is operable to dynamically adjust said event configurable parameters for the limited capacity event based upon the analyzed data;

computer usable program code stored on a non-transient storage medium that upon being executed by a processor is operable to auction tickets for the limited capacity event, wherein specifics of the auctioning step vary based upon determinable seller risks and upon the start and end times associated with an auction;

computer usable program code stored on a non-transient storage medium that upon being executed by a processor is operable to receive a plurality of bids, said bids including bidder specific factors;

computer usable program code stored on a non-transient storage medium that upon being executed by a processor is operable to determine factor values for each of the specific factors;

computer usable program code stored on a storage medium that upon being executed by a processor is operable to adjusting a value for each bid in accordance with the determined factor values; and computer usable program code stored on a non-transient storage medium that upon being executed by a processor is operable to accept bids based upon the adjusted values.

14. The computer program product of claim 13, wherein the specific factors comprise at least three factors selected from a group of factors consisting of a bid price, payment reliability, customer loyalty, at least one customer selected purchasing option associated with the bid, at least one customer imposed purchasing constraint associated with the bid, a consumer commitment time, and a seller commitment time.

15. The computer program product of claim 13, wherein the specific factors include at least two factors selected from a group of factors consisting of a customer loyalty rating, a customer reliability rating, options elected by a customer, and customer selected constraints imposed upon an associated bid.

16. The computer program product of claim 13, wherein the specific factors include at least one factor selected from a group of factors consisting of a customer commitment time, a seller commitment time, and a quality of consumer data provided by the customer to the seller.

* * * * *